ELLA G. HALLER.
Fruit-Jars.
No. 136,240.    Patented Feb. 25, 1873.
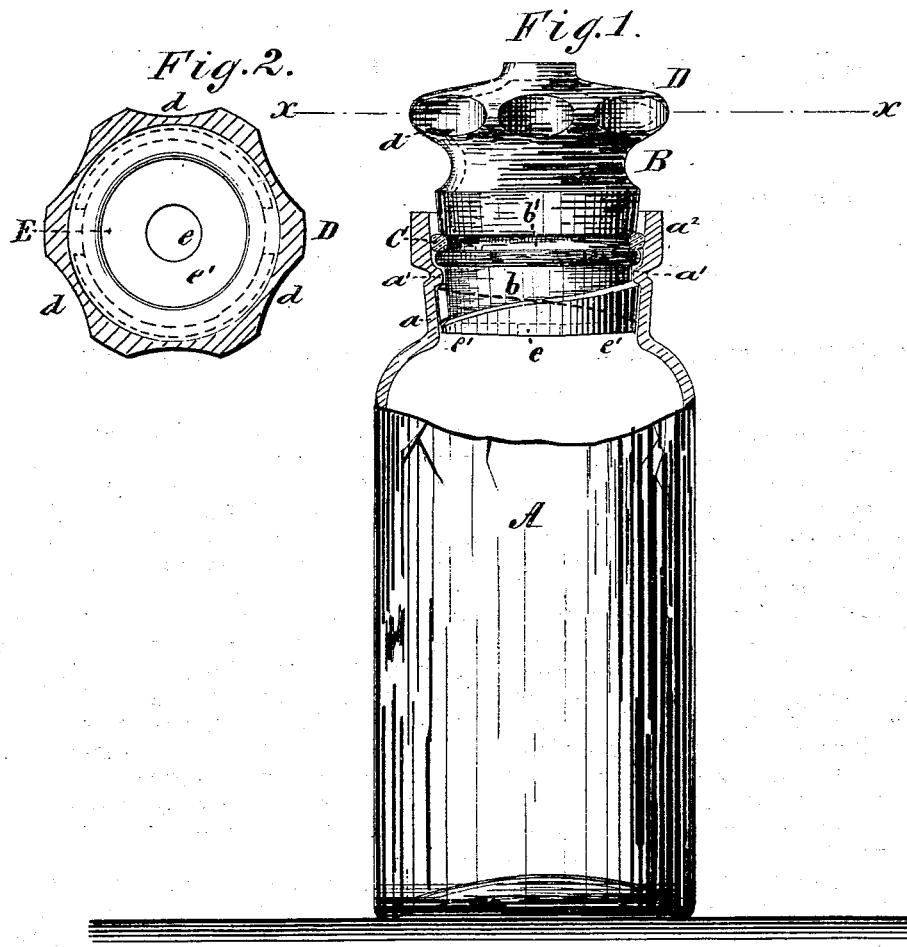
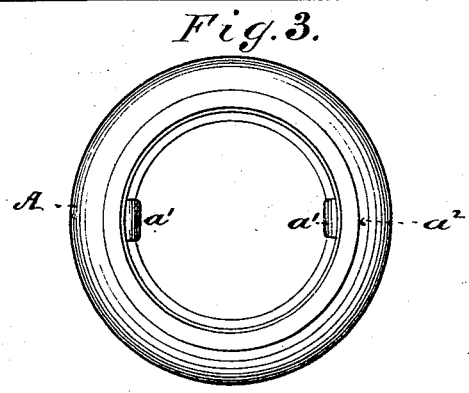

UNITED STATES PATENT OFFICE.

ELLA G. HALLER, OF CARLISLE, PENNSYLVANIA.

IMPROVEMENT IN FRUIT-JARS.

Specification forming part of Letters Patent No. 136,240, dated February 25, 1873.

*To all whom it may concern:*

Be it known that I, Mrs. ELLA G. HALLER, of Carlisle, in the county of Cumberland and State of Pennsylvania, have invented a new and useful Improvement in Fruit-Jars; and I do hereby declare the following to be a full, clear, and exact description of the same, reference being had to the accompanying drawing forming part of this specification.

The invention relates to fruit-jars; and consists in a hollow glass stopper having a single central opening at the bottom, and in a jar having blown lugs on the inside and a plain ring on the outside, as hereinafter fully described and pointed out in the claims.

Figure 1 is a vertical and sectional elevation. Fig. 2 is a plan view of stopper. Fig. 3 is a horizontal section of jar.

In the drawing, A represents a fruit-jar provided with blown lugs $a^1$ $a^1$ on the inside, and plain ring $a^2$ thereabove on the outside. I blow the body and lugs first, and then apply plastic glass to form the plain ring $a^2$. B is the stopper, having inclined grooves $b$ and annular groove $b'$ on the outside. C is the rubber gasket, which is located in groove $b'$, and D a cap which surmounts the stopper. This stopper is air-tight, except at the single centrally-placed hole $e$, which opens out from a chamber, E, the inside of whose bottom slopes downwardly to this hole.

The fruit is placed in the heated jar while the cover (filled with sirup) is fitted close into the neck. This excludes all air, and as the bulk of sirup and fruit contracts in cooling, the vacuum formed in the jar is filled by the inflow of sirup from the stopper. The gasket, being always below the level of the sirup, is prevented from shrinking so as to admit air, while the top of stopper being solid there is obtained an absolute exclusion of air, and a consequent certainty in the preservation of the fruit for any length of time.

Having thus described my invention, what I claim as new, and desire to secure by Letters Patent, is—

1. A blown-glass stopper with an inside chamber having a central opening at the bottom only, as and for the purpose set forth.

2. As an article of manufacture, a glass jar having its neck provided on the inside with blown lugs $a^1$, and on the outside with a plain ring, $a^2$, as and for the purpose set forth.

MRS. ELLA G. HALLER.

Witnesses:
BENJN. EGGLESTON,
W. HEILL.